(12) United States Patent
Li

(10) Patent No.: US 12,426,023 B2
(45) Date of Patent: Sep. 23, 2025

(54) BWP SWITCHING METHOD AND DEVICE, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 784 days.

(21) Appl. No.: 17/611,893

(22) PCT Filed: May 17, 2019

(86) PCT No.: PCT/CN2019/087358
§ 371 (c)(1),
(2) Date: Nov. 16, 2021

(87) PCT Pub. No.: WO2020/232566
PCT Pub. Date: Nov. 26, 2020

(65) Prior Publication Data
US 2022/0240250 A1    Jul. 28, 2022

(51) Int. Cl.
*H04W 72/0453* (2023.01)
*H04L 5/00* (2006.01)
*H04W 72/23* (2023.01)

(52) U.S. Cl.
CPC ....... *H04W 72/0453* (2013.01); *H04L 5/0035* (2013.01); *H04L 5/0098* (2013.01); *H04W 72/23* (2023.01); *H04L 5/0053* (2013.01)

(58) Field of Classification Search
CPC .............. H04W 72/0453; H04W 72/23; H04L 5/0098; H04L 5/0053; H04L 5/001; H04L 5/0023
See application file for complete search history.

(56) References Cited

U.S. PATENT DOCUMENTS 11,706,744 B2 *  7/2023  Park ................. H04W 72/0453
                                                    370/329
2018/0279406 A1    9/2018  Agarwal et al.
(Continued)

FOREIGN PATENT DOCUMENTS

CN    109155948 A    1/2019
CN    109586866 A    4/2019
(Continued)

OTHER PUBLICATIONS

Written Opinion of the International Search Authority Application No. PCT/CN/2019/087358 dated Jan. 23, 2020, with English Translation (6p).
(Continued)

*Primary Examiner* — Ivan O Latorre
(74) *Attorney, Agent, or Firm* — Arch & Lake LLP

(57) ABSTRACT

Provided are methods, apparatuses, and storage mediums for switching a bandwidth part (BWP). The method includes: sending, by a base station, transmitter receiver point (TRP) configuration information to a terminal; determining, by the terminal, a master TRP based on the TRP configuration information; sending, by the base station, BWP switching information to the terminal through the master TRP; switching, by the terminal, to a target BWP based on the BWP switching information.

13 Claims, 4 Drawing Sheets

(56) References Cited

U.S. PATENT DOCUMENTS

| | | | |
|---|---|---|---|
| 2020/0008231 A1* | 1/2020 | Vilaipornsawai | H04W 72/21 |
| 2020/0266961 A1* | 8/2020 | Tsai | H04J 11/0053 |
| 2020/0351892 A1* | 11/2020 | Yi | H04L 5/0092 |
| 2022/0158783 A1* | 5/2022 | Matsumura | H04L 5/0032 |

FOREIGN PATENT DOCUMENTS

| | | | |
|---|---|---|---|
| WO | 2018231812 A1 | 12/2018 | |
| WO | 2019067925 A1 | 4/2019 | |

OTHER PUBLICATIONS

International Search Report of the International Application No. PCT/CN2019/087358 dated Jan. 23, 2020, with English translation, (4p).

* cited by examiner

BWP SWITCHING METHOD AND DEVICE, AND STORAGE MEDIUM

REFERENCE TO RELATED APPLICATION

This application is the U.S. national phase application of International Patent Application No. PCT/CN2019/087358 filed on May 17, 2019, the entire content of which is incorporated herein by reference in its entirety for all purposes.

TECHNICAL FIELD

The present disclosure relates to the field of communication technologies, and in particular to methods, apparatuses and storage mediums for switching a bandwidth part (BWP).

BACKGROUND

In a 5G New Radio (NR) system, a base station may configure a plurality of bandwidth parts (BWPs) for a terminal. Some of the BWPs have a large bandwidth and some have a small bandwidth. In addition, the terminal can only have one active BWP in a same time and the terminal can only receive or send data on the active BWP. If the terminal has a larger amount of data to be transmitted, the base station may instruct the terminal to switch to a BWP with a larger bandwidth; if the terminal has a smaller amount of data to be transmitted, the base station may instruct the terminal to switch to a BWP with a smaller bandwidth.

In order to increase a spatial diversity gain, the base station may send downlink data to the terminal via antenna panels of a plurality of transmitter receiver points (TRPs); and correspondingly, the terminal may also receive data from the base station via a plurality of panels, or send uplink data to the base station via a plurality of panels. At this time, if the communication with a plurality of TRPs is in a non-ideal backhaul, each of the TRPs configures a Physical Downlink Control Channel (PDCCH) resource for the terminal and schedules a corresponding Physical Downlink Shared Channel (PDSCH) resource to send downlink data to the terminal, or schedules a corresponding Physical Uplink Shared Channel (PUSCH) resource such that the terminal sends uplink data to the base station on the PUSCH resource.

In a scenario where a plurality of TRPs communicate with a terminal, the plurality of TRPs can only communicate with the same terminal on a same active BWP. At this time, the terminal cannot determine which TRP instructs a BWP for BWP switching.

SUMMARY

The present disclosure provides methods, apparatuses, and storage mediums for switching a BWP. The technical solution is described below.

According to a first aspect of the present disclosure, a method of switching a BWP is provided. The method includes that: a base station sends transmitter receiver point (TRP) configuration information, where the TRP configuration information indicates a master TRP configured by the base station, the master TRP is one of a plurality of TRPs configured by the base station; and the base station sends BWP switching information via the master TRP, where the BWP switching information is used to instruct switching to a target BWP.

According to a second aspect of the present disclosure, a method of switching a BWP is provided. The method includes that: a terminal receives TRP configuration information; the terminal determines a master TRP based on the TRP configuration information, where the master TRP is one of a plurality of TRPs configured for the terminal; the terminal receives BWP switching information from the master TRP, where the BWP switching information is used to instruct the terminal to switch to a target BWP; and the terminal switches to the target BWP based on the BWP switching information.

According to a third aspect of the present disclosure, an apparatus for switching a BWP is provided, which is applied to a base station. The apparatus includes a processor; and a memory for storing instructions executable by the processor;

Further, the processor is configured to: send TRP configuration information, where the TRP configuration information indicates a master TRP configured by the base station, the master TRP is one of a plurality of TRPs configured by the base station; and send BWP switching information via the master TRP, where the BWP switching information is used to instruct switching to a target BWP.

According to a fourth aspect of the present disclosure, an apparatus for switching a BWP is provided, which is applied to a terminal. The apparatus includes a processor and a memory for storing instructions executable by the processor.

Further, the processor is configured to: receive TRP configuration information; determine a master TRP based on the TRP configuration information, where the master TRP is one of a plurality of TRPs configured for the terminal; receive BWP switching information from the master TRP, where the BWP switching information is used to instruct the terminal to switch to a target BWP; and switch to the target BWP based on the BWP switching information.

According to a fifth aspect of the present disclosure, a non-transitory computer readable storage medium storing computer programs is provided, where the computer programs are executed by a processor to implement the steps of the method according to the first aspect or the steps of the method according to the second aspect.

It should be understood that the above general descriptions and subsequent detailed descriptions are merely illustrative and explanatory rather than limiting of the present disclosure.

BRIEF DESCRIPTION OF THE DRAWINGS

The accompanying drawings, which are incorporated in and constitute a part of the present description, illustrate embodiments consistent with the present disclosure and serve to explain the principles of the present disclosure together with the description.

DETAILED DESCRIPTION OF THE EMBODIMENTS

Figure 1:
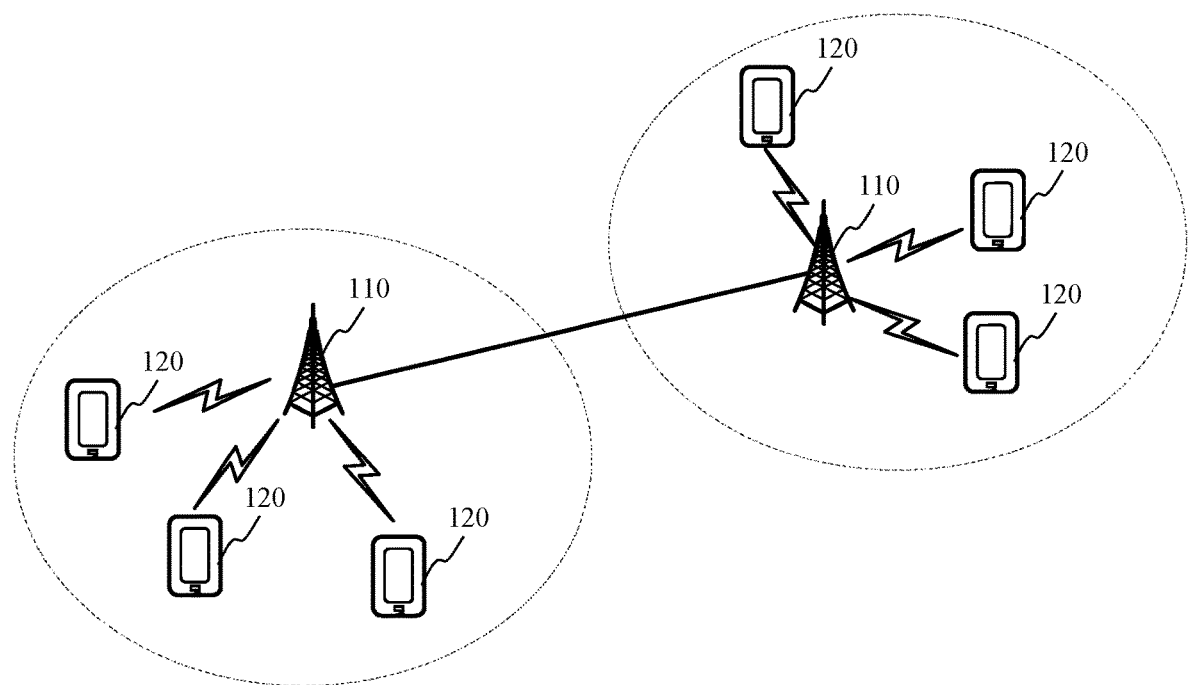
FIG. 1 is a schematic diagram illustrating a network architecture according to an embodiment of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The network architectures and service scenarios described in the embodiments of the present disclosure are intended to describe the technical solution of the present disclosure more clearly rather than constitute limitation to the technical solution of the embodiments of the present disclosure. It is known to those skilled in the art that along with evolution of network architectures and appearance of new service scenarios, the technical solution of the embodiments of the present disclosure is also applicable to similar technical problems.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

FIG. 1 is a schematic diagram illustrating a network architecture according to an embodiment of the present disclosure. The network architecture may include a base station 110 and a terminal 120.

The base station 110 is deployed in an access network. An access network in a 5G NR system may be referred to as New Generation-Radio Access Network (NG-RAN). Communication between the base station 110 and the terminal 120 may be performed by a radio technology, for example, by cellular technology.

The base station 110 is an apparatus which is deployed in an access network to provide wireless communication function for the terminal 120. The base station may include various types of macro-base stations, micro-base stations, relay stations and access points and the like. In a system adopting a different wireless access technology, a device having the base station function may have a different name. For example, in a 5G NR system, the device is called gNodeB or gNB. Along with evolution of communication technologies, the name of "base station" may take change. For ease of descriptions, in the embodiments of the present disclosure, the above apparatuses for providing wireless communication function for the terminal 120 are all called base stations. The base station 110 may also be a vehicle-mounted device, which is applicable to a scenario of vehicle-to-vehicle communication of an internet of vehicles. In a case of vehicle-to-vehicle communication, the channels or signalings in the present disclosure are all channels or signalings applicable to a sidelink.

Usually, there may be a plurality of terminals 120 which are deployed in a cell under the management of each base station 110. The terminal 120 may include various hand-held devices, vehicle-mounted devices, wearable devices, computing devices having wireless communication function, or other processing devices connecting to a wireless modem, or various forms of user equipments, mobile stations (MS), terminal devices or the like. For ease of descriptions, the above mentioned devices are all called terminals in the embodiments of the present disclosure. The terminal 120 may also be a vehicle-mounted device applicable to a scenario of a vehicle-to-vehicle communication of an internet of vehicles. In a case of vehicle-to-vehicle communication, the channels or signalings in the present disclosure are all channels or signalings applicable to a sidelink.

The 5G NR system in the embodiments of the present disclosure may also be referred to as 5G system or NR system as long as those skilled in the art can understand its meaning. The technical solution described in the embodiments of the present disclosure may be applied to a 5G NR system, or an evolution system subsequent to the 5G NR system or a 5G NR internet-of-vehicle system.

Figure 2:
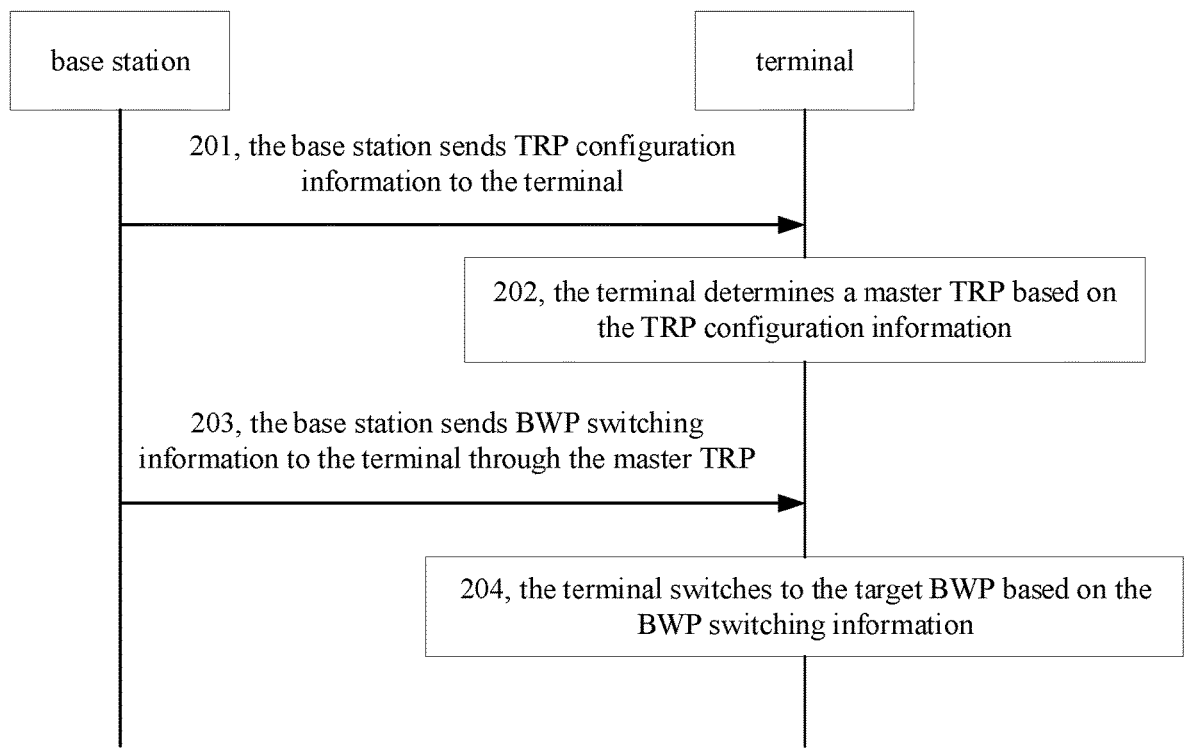
FIG. 2 is a flowchart illustrating a method of switching a BWP according to an embodiment of the present disclosure.

FIG. 2 is a flowchart of a method of switching a bandwidth part (BWP) according to an embodiment of the present disclosure. The method may be applied to the network architecture shown in FIG. 1. The method may include the following steps 201-204.

At step 201, a base station sends transmitter receiver point (TRP) configuration information to a terminal.

In an embodiment of the present disclosure, the base station has a plurality of TRPs and may communicate with the terminal via the plurality of TRPs. If communication between a plurality of TRPs is carried out by a non-ideal backhaul, each TRP configures a Physical Downlink Control Channel (PDCCH) resource for the terminal and schedules a corresponding Physical Downlink Shared Channel (PDSCH) resource to send downlink data to the terminal, or schedules a corresponding Physical Uplink Shared Channel (PUSCH) resource such that the terminal sends uplink data to the base station on the PUSCH resource. However, the terminal can only have one active BWP in a same time and the terminal can only receive or send data on the active BWP. At this time, the terminal cannot determine which TRP instructs a BWP for BWP switching. As a result, the base station may configure a master TRP for the terminal such that the terminal can perform BWP switching based on the BWP instructed by the master TRP in a scenario where a plurality of TRPs communicate with the terminal.

The TRP configuration information is used to notify the terminal of the TRP configured by the base station for the terminal. The base station may configure one or more TRPs for the terminal. The base station configures a plurality of TRPs for the terminal, for example, the base station configures n TRPs for the terminal, where n is an integer greater than 1. In this case, the TRP configuration information is further used to indicate a master TRP configured by the base station for the terminal, and the master TRP is one of the n TRPs configured by the base station for the terminal. Correspondingly, the terminal receives the TRP configuration information from the base station.

In one possible implementation, the above TRP configuration information includes identifier information of each TRP configured by the base station for the terminal, where a TRP with minimum identifier information is the master TRP, or a TRP with maximum identifier information is the master TRP.

The base station may assign different identifier information (TRP ID) to different TRPs. Taking the TRP with the minimum identifier information as the master TRP, the base station assigns minimum identifier information to the master TRP, for example, assigns TRP ID 0 to the master TRP. Illustratively, the TRP configuration information sent by the base station to the terminal includes three TRP IDs, which are 0, 1 and 2 respectively and thus, the terminal takes the TRP with the TRP ID being 0 as the master TRP. Alternatively, taking the TRP with maximum identifier information as the master TRP, the TRP configuration information sent by the base station to the terminal includes three TRP IDs, which are 0, 1 and 2 respectively and thus the terminal takes the TRP with the TRP ID being 2 as the master TRP.

If reconfiguration is required, when the TRP with the minimum identifier information is taken as the master TRP, the base station may assign minimum identifier information to a new master TRP, and then send new TRP configuration information to the terminal; when the TRP with the maximum identifier information is taken as the master TRP, the base station may assign maximum identifier information to a new master TRP and then send new TRP configuration information to the terminal.

In addition, the TRP corresponding to the TRP identifier information may be notified to the terminal by the base station. For example, the base station sends a correspondence between the TRP identifier information and TRP indication information to the terminal. The TRP indication information is used for the terminal to determine a corresponding TRP, and different TRPs have different indication information. Alternatively, the TRP indication information includes a CORESET position and/or transmission configuration indication (TCI) state serial number of a TRP. The terminal may determine the TRP represented by each piece of identifier information based on the above correspondence. The above correspondence may be carried in the TRP configuration information, or sent after the TRP configuration information is sent, which is not limited in the embodiments of the present disclosure.

In another possible implementation, the TRP configuration information includes CORESET serial number and/or CORESET set serial number of each TRP configured by the base station for the terminal, where the TRP with the minimum CORESET serial number and/or CORESET set serial number is the master TRP, or the TRP with the maximum CORESET serial number and/or CORESET set serial number is the master TRP.

Illustratively, the TRP with the minimum CORESET serial number is the master TRP. It is assumed that the base station configures two TRPs denoted as TRP #0 and TRP #1 respectively for the terminal. For example, when the TRP configuration information includes the CORESET serial number of each TRP, if the CORESET serial number of the TRP #0 is 0, 1, and 2, and the CORESET serial number of the TRP #1 is 3, 4 and 5, the TRP corresponding to the CORESET serial number 0 (i.e. TRP #0) is the master TRP. Furthermore, it may also be stated the TRP with the maximum CORESET serial number is the master TRP. As in the above example, the TRP corresponding to the CORESET serial number 5 (i.e. TRP #1) is the master TRP.

Illustratively, the TRP with the minimum CORESET set serial number is the master TRP. It is still assumed that the base station configures two TRPs denoted as TRP #0 and TRP #1 respectively for the terminal. When the TRP configuration information includes the CORESET set serial number of each TRP, if the TRP #0 corresponds to a first CORESET set, the first CORESET set includes CORESET #0, CORESET #1 and CORESET #2 and the serial number of the first CORESET set is 0. If the TRP #1 corresponds to a second CORESET set, the second CORESET set includes CORESET #3, CORESET #4 and CORESET #5, and the serial number of the second CORESET set is 1. In this case, the TRP corresponding to the CORESET set serial number 0 (i.e. TRP #0) is the master TRP. Further, it may also be stated that the TRP with the maximum CORESET set serial number is the master TRP. As mentioned in the above example, the TRP corresponding to the CORESET set serial number 1 (i.e. TRP #1) is the master TRP.

If reconfiguration is required, when it is stated that the TRP with the minimum CORESET serial number and/or CORESET set serial number is the master TRP, the base station may assign a minimum CORESET serial number and/or CORESET set serial number to a new master TRP and then send new TRP configuration information to the terminal. For example, when required to re-configure a new master TRP for the terminal, the base station may assign the CORESET #0 to a new master TRP. Illustratively, it is assumed that the current master TRP is TRP #0, that is, the CORESET of the TRP #0 includes CORESET #0. If a signal intensity of the TRP #0 becomes poor, the base station needs to re-configure a new master TRP for the terminal, for example, TRP #1, and assign the CORESET #0 to the TRP #1. For example, at this time, the CORESET serial numbers of the TRP #1 are 0, 1, and 2, and the CORESET serial numbers of the TRP #0 are 3, 4, and 5.

If reconfiguration is required, when it is stated that the TRP with the maximum CORESET serial number and/or CORESET set serial number is the master TRP, the base station may assign a maximum CORESET serial number and/or CORESET set serial number to a new master TRP and then send new TRP configuration information to the terminal. For example, when required to re-configure a new master TRP for the terminal, the base station may assign the CORESET #5 to a new master TRP. Illustratively, it is assumed that the current master TRP is TRP #1, that is, the CORESET of the TRP #1 includes CORESET #5. If a signal intensity of the TRP #1 becomes poor, the base station needs to re-configure a new master TRP for the terminal, for example, TRP #0, and assign the CORESET #5 to the TRP #0. For example, at this time, the CORESET serial numbers of the TRP #1 are 0, 1, and 2, and the CORESET serial numbers of the TRP #0 are 3, 4, and 5.

In one example, the above TRP configuration information is sent to the terminal via an RRC signaling or MAC signaling.

Illustratively, the base station may send the TRP configuration information to the terminal via an RRC signaling or MAC signaling. The TRP configuration information includes identifier information of each TRP configured by the base station for the terminal, or a CORESET serial number and/or CORESET set serial number of each TRP configured by the base station for the terminal, such that the terminal may determine each TRP configured by the base station based on the TRP configuration information and determine a master TRP therefrom. In this case, the base station may notify the terminal of each TRP configured for the terminal through only one RRC signaling or MAC signaling and also indicate a master TRP simultaneously, thus helping to save signaling overhead.

Illustratively, the base station may firstly configure a plurality of TRPs for the terminal by an RRC signaling, and then indicate a master TRP for the terminal by an MAC signaling. For example, the base station configures three TRPs, TRP #0, TRP #1 and TRP #2 for the terminal by an RRC signaling, and then indicates TRP #0 as a master TRP for the terminal by an MAC signaling. Furthermore, when required to re-configure a new master TRP for the terminal, the base station may indicate a new master TRP for the terminal by a new MAC signaling. In this case, the base station notifies the terminal of each TRP configured for the terminal by an RRC signaling, and then indicates a master TRP by an MAC signaling, thus making the indication of the master TRP more flexible.

At step 202, the terminal determines a master TRP based on the TRP configuration information.

After receiving the above TRP configuration information, the terminal may determine a master TRP based on the TRP configuration information.

In one possible implementation, the TRP configuration information includes identifier information of each TRP configured by the base station for the terminal, and the terminal determines the TRP with minimum identifier information as the master TRP, or determines the TRP with maximum identifier information as the master TRP.

In another possible implementation, the TRP configuration information includes CORESET serial number and/or CORESET set serial number of each TRP configured by the base station for the terminal, and the terminal determines the TRP with minimum CORESET serial number and/or CORESET set serial number as the master TRP, or determines the TRP with maximum CORESET serial number and/or CORESET set serial number as the master TRP.

At step 203, the base station sends BWP switching information to the terminal through the master TRP.

The above BWP switching information is used to instruct the terminal to switch to a target BWP. The BWP switching information may include identifier information of the target BWP. Alternatively, the above BWP switching information is sent to the terminal by a Downlink Control Information (DCI) signaling.

At step 204, the terminal switches to the target BWP based on the BWP switching information.

The terminal may obtain the identifier information of the target BWP based on the BWP switching information and then switch to the target BWP.

At this time, there will be the following two main cases with other TRPs than the master TRP in the n TRPs configured by the base station for the terminal: firstly, the DCI signaling sent by other TRPs carries the BWP switching information to instruct the terminal to perform BWP switching, but the terminal neglects the BWP switching information sent by other TRPs; secondly, the DCI signaling sent by other TRPs does not carry the BWP switching information and thus does not instruct the terminal to perform BWP switching.

In conclusion, in the technical solution provided by the embodiments of the present disclosure, the base station sends the TRP configuration information to the terminal such that the terminal determines the master TRP based on the TRP configuration information; further, the base station sends BWP switching information to the terminal through the master TRP to instruct the terminal to switch the BWP to the target BWP. In this way, the terminal can perform BWP switching based on the BWP instructed by the master TRP in a scenario where a plurality of TRPs communicate with the terminal. Therefore, a BWP switching solution applicable to a multi-TRP scenario is provided to ensure the accuracy of BWP switching and achieve reliable transmission between the base station and the terminal.

Communication between the terminal and each TRP will be described below.

In an example, during a target time period subsequent to that the base station sends the TRP configuration information to the terminal, other TRPs than the master TRP in the n TRPs are disabled to allocate resource to the terminal.

In the target time period, only the master TRP can allocate resource to the terminal and communicate with the terminal. The target time period may be pre-configured, which is not limited herein.

In an example, the master TRP may be further configured to, after sending the BWP switching information, send a BWP switching notification to other TRPs than the master TRP in the n TRPs, where the BWP switching notification is used to notify other TRPs that the terminal already switches to the target BWP; other TRPs are used to allocate resource to the terminal on the target BWP. Alternatively, the master TRP is further configured to, before sending the BWP switching information, send a BWP switching notification to other TRPs than the master TRP in the n TRPs, where the BWP switching notification is used to notify other TRPs that the terminal will switch to the target BWP after a target time.

A plurality of TRPs may communicate with each other. When a plurality of TRPs communicate with each other via a non-ideal backhaul, each TRP is scheduled independently. As a result, the master TRP may also send a BWP switching notification to other TRPs to notify other TRPs that the terminal already switches to the target BWP or that the terminal will switch to the target BWP after the target time. Thus, other TRPs may allocate resource to the terminal on the target BWP.

In an example, when switching to the target BWP, the terminal starts a timer. Before the timer expires, the terminal communicates with only the master TRP based on allocated resource in PDCCH information sent by the master TRP. The above PDCCH information may be DCI signaling.

The communications between the above terminal and the master TRP includes but not limited to: receiving PDSCH downlink data, receiving Synchronization Signal Block (SSB), receiving Non Zero Power Channel State Information Reference Signal (NZP CSI-RS), receiving Discovery Reference Signal (DRS), sending Physical Uplink Control Channel (PUCCH) information, sending PUSCH information, sending Physical Random Access Channel (PRACH) information, sending Sounding Reference Signal (SRS) and the like, which is not limited in the embodiments of the present disclosure.

In one example, a value of the above timer may be pre-written into a chip of the terminal and/or configured by the base station for the terminal. The base station may configure the value of the above timer for the terminal through an RRC signaling.

There are two main cases with the value of the above timer.

In a first case, when the above timer has only one value greater than 0, it indicates that the communication between a plurality of TRPs is carried out by a non-ideal backhaul. The value of the timer may be written into the chip of the terminal, and the base station may notify the terminal in advance by an RRC signaling or MAC signaling that the terminal needs to start the timer when switching to the target BWP.

In a second case, the above timer has two values, one of which is 0 and the other is greater than 0. When the value of the timer is 0, it indicates that the communication between a plurality of TRPs is carried out by an ideal backhaul, resulting in no delay. At this time, the base station needs to notify, in advance, the terminal of which timer is to be started at the time of switching to the target BWP. In one example, the base station may notify the terminal of which timer is to be started by an RRC signaling, MAC signaling or DCI signaling.

Before the timer expires, there are two main cases with other TRPs than the master TRP in the n TRPs.

In a first case, other TRPs may send the PDCCH information to the terminal but the terminal may fail to receive it. For example, for the un-switched BWP and the switched target BWP, the CORESET positions used by other TRPs to send the PDCCH information are different, and thus the terminal cannot receive the PDCCH information on the switched target BWP.

In a second case, the terminal may receive the PDCCH information from other TRPs but a frequency domain resource indicated by the PDCCH information is instructed based on the un-switched BWP and hence is not matched with a frequency domain resource of the switched target BWP. If the terminal occupies the PDSCH resource on the switched target BWP based on the PDCCH information and the PDSCH resource is actually assigned to another terminal, error and interference will result. Likewise, if the terminal occupies the PUSCH resource on the switched target BWP based on the PDCCH information and the PUSCH resource is actually assigned to another terminal, error and interference will also result.

After the timer expires, the terminal keeps in communication with the master TRP and communicates with other TRPs based on allocated resource in the PDCCH information sent by other TRPs of the n TRPs.

After the timer expires, the terminal may monitor whether other TRPs send the PDCCH information while being in communication with the master TRP. If other TRPs send the PDCCH information, the terminal may communicate with other TRPs on allocated resource in the PDCCH information based on the PDCCH information sent by other TRPs.

In conclusion, in the technical solution of the embodiments of the present disclosure, the timer is disposed such that the terminal can communicate with only the master TRP after the terminal switches to the target BWP and before the timer expires. After the timer expires, the terminal may also communicate with other TRPs while being in communication with the master TRP, thus avoiding interference and error resulting from a scenario where a plurality of TRPs communicate with the terminal.

It is noted that in the above method embodiments, some descriptions are made to the technical solution of the present disclosure from the perspective of interaction of the terminal and the base station; the above steps performed at the base station side may be separately implemented as a BWP switching method at the base station side; and the above steps performed at the terminal side may be separately implemented as a BWP switching method at the terminal side.

The following apparatus embodiments of the present disclosure are used to carry out the method embodiments of the present disclosure. Those details not mentioned in the apparatus embodiments of the present disclosure may be referred to the method embodiments of the present disclosure.

Figure 3:
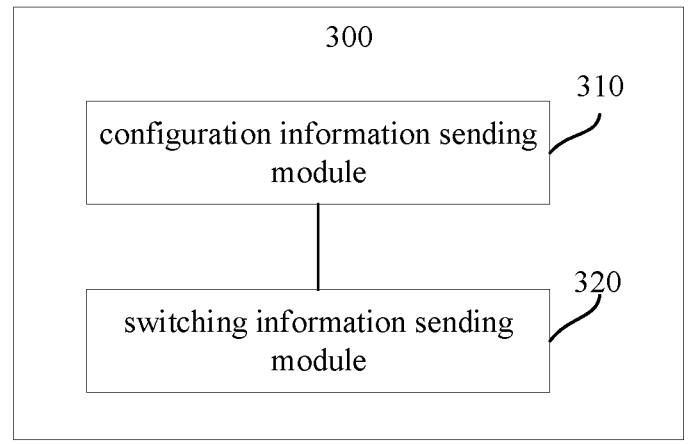
FIG. 3 is a block diagram illustrating an apparatus for switching a BWP according to an embodiment of the present disclosure.

FIG. 3 is a block diagram illustrating an apparatus for switching a BWP according to an embodiment of the present disclosure. The apparatus has the function of implementing the above method embodiments at the base station side. The function can be implemented by hardware or by executing a corresponding software using hardware. The apparatus may be the above base station or disposed in the base station. As shown in FIG. 3, the apparatus 300 may include a configuration information sending module 310 and a switching information sending module 320.

The configuration information sending module 310 is configured to send transmitter receiver point (TRP) configuration information, where the TRP configuration information indicates a master TRP configured by the base station, the master TRP is one of n TRPs configured by the base station, and n is an integer greater than 1.

The switching information sending module 320 is configured to send BWP switching information via the master TRP, where the BWP switching information is used to instruct switching to a target BWP.

In conclusion, in the technical solution of the embodiments of the present disclosure, the base station sends the TRP configuration information to the terminal such that the terminal determines the master TRP based on the TRP configuration information; further, the base station sends BWP switching information to the terminal through the master TRP to instruct the terminal to switch the BWP to the target BWP. In this way, the terminal can perform BWP switching based on the BWP instructed by the master TRP in a scenario where a plurality of TRPs communicate with the terminal. Therefore, a BWP switching solution applicable to a multi-TRP scenario is provided to ensure the accuracy of BWP switching and achieve reliable transmission between the base station and the terminal.

In an example, the TRP configuration information includes identifier information of each TRP; a TRP with minimum identifier information is the master TRP, or a TRP with maximum identifier information is the master TRP.

In an example, the TRP configuration information includes a control resource set (CORESET) serial number and/or CORESET set serial number of each TRP; a TRP with a minimum CORESET serial number and/or CORESET set serial number is the master TRP, or a TRP with a maximum CORESET serial number and/or CORESET set serial number is the master TRP.

In an example, the TRP configuration information is sent to the terminal via an RRC signaling, and/or an MAC signaling.

In an example, the master TRP is further configured to, after sending the BWP switching information, send a BWP switching notification to other TRPs than the master TRP in the n TRPs, where the BWP switching notification is used to notify the other TRPs that the terminal already switches to the target BWP; the other TRPs are used to allocate resource to the terminal on the target BWP.

In an example, during a target time period subsequent to sending the TRP configuration information, the other TRPs than the master TRP in the n TRPs are disabled to allocate resource to the terminal.

Figure 4:
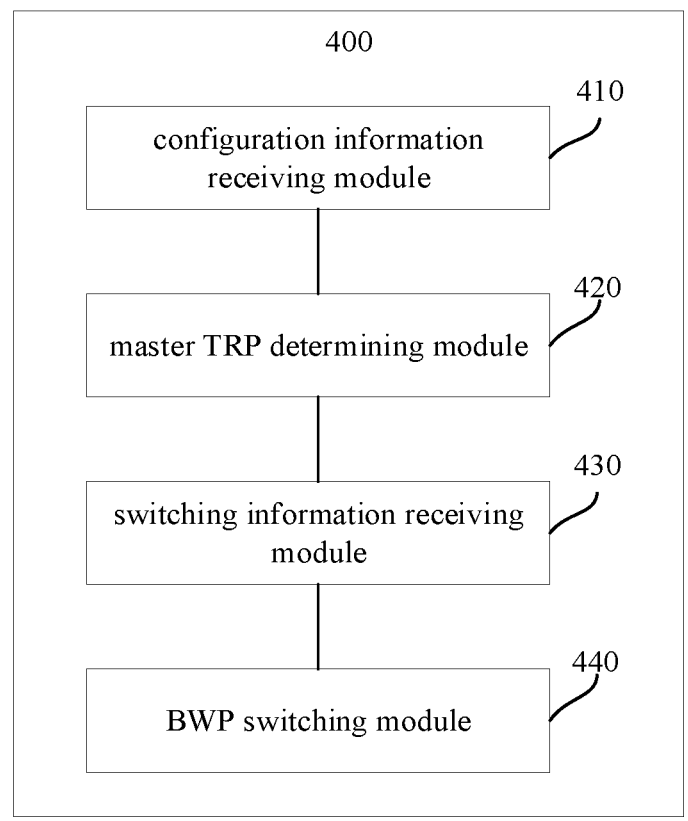
FIG. 4 is a block diagram illustrating an apparatus for switching a BWP according to another embodiment of the present disclosure.

FIG. 4 is a block diagram illustrating an apparatus for switching a BWP according to another embodiment of the present disclosure. The apparatus has the function of implementing the above method embodiments at the terminal side. The function can be implemented by hardware or by executing a corresponding software using hardware. The apparatus may be the above terminal or disposed in the terminal. As shown in FIG. 4, the apparatus 400 may include a configuration information receiving module 410, a master TRP determining module 420, a switching information sending module 430 and a BWP switching module 440.

The configuration information receiving module 410 is configured to receive transmitter receiver point (TRP) configuration information.

The master TRP determining module 420 is configured to determine a master TRP based on the TRP configuration information, where the master TRP is one of n TRPs configured for the terminal and n is an integer greater than 1.

The switching information receiving module 430 is configured to receive BWP switching information from the master TRP, where the BWP switching information is used to instruct the terminal to switch to a target BWP.

The BWP switching module 440 is configured to enable the terminal to switch to the target BWP based on the BWP switching information.

In conclusion, in the technical solution of the embodiments of the present disclosure, the base station sends the TRP configuration information to the terminal such that the terminal determines the master TRP based on the TRP configuration information; further, the base station sends BWP switching information to the terminal through the master TRP to instruct the terminal to switch the BWP to the target BWP. In this way, the terminal can perform BWP switching based on the BWP instructed by the master TRP in a scenario where a plurality of TRPs communicate with the terminal. Therefore, a BWP switching solution applicable to a multi-TRP scenario is provided to ensure the accuracy of BWP switching and achieve reliable transmission between the base station and the terminal.

In an example, the TRP configuration information includes identifier information of each TRP;

the master TRP determining module 420 is configured to determine a TRP with minimum identifier information as the master TRP, or determine a TRP with maximum identifier information as the master TRP.

In an example, the TRP configuration information includes a control resource set (CORESET) serial number and/or CORESET set serial number of each TRP;

the master TRP determining module 420 is configured to determine a TRP with a minimum CORESET serial number and/or CORESET set serial number as the master TRP; or, determine a TRP with a maximum CORESET serial number and/or CORESET set serial number as the master TRP.

Figure 5:
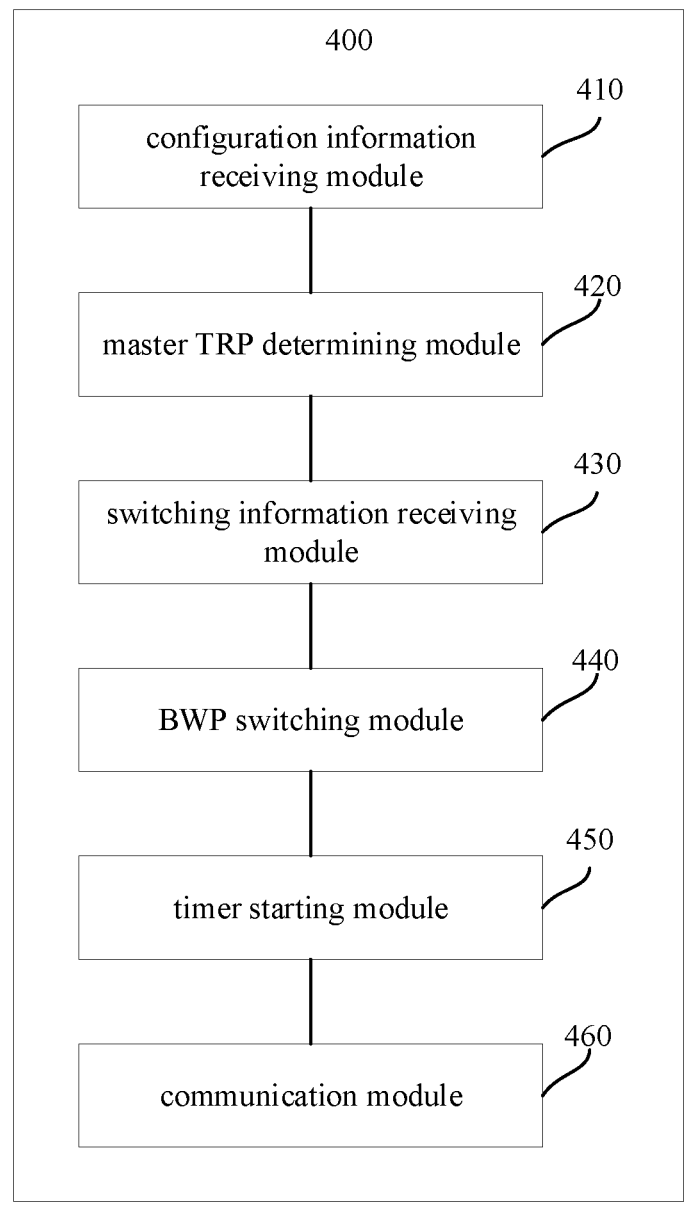
FIG. 5 is a block diagram illustrating an apparatus for switching a BWP according to another embodiment of the present disclosure.

In an example, in combination with FIG. 5, the apparatus further includes a timer starting module 450.

The timer starting module 450 is configured to start a timer when switching is performed to the target BWP;

before the timer expires, the terminal communicates with only the master TRP based on allocated resource in physical downlink control channel (PDCCH) information sent by the master TRP.

In an example, in combination with FIG. 5, the apparatus further includes a communication module 460.

The communication module 460 is configured to, after the timer expires, keep in communication with the master TRP, and communicate with other TRPs based on allocated resource in PDCCH information sent by the other TRPs of the n TRPs.

In an example, a value of the timer is pre-written into a chip of the terminal, and/or, configured for the terminal by a base station.

It is noted that the functions of the apparatus according to the above embodiments are illustrated based only on division of the above functional modules, and can be allocated to different functional modules according to actual requirements in an actual application, that is, the apparatus is functionally divided into different functional modules to complete all or part of the above functions.

The specific manners in which various modules of the apparatus according to the above embodiments perform operations are already detailed in the method-related embodiments and thus will not be repeated herein.

Another example of the present disclosure further provides an apparatus for switching a bandwidth part (BWP). The apparatus may be applied to the base station described above to implement the BWP switching method at the base station side in the present disclosure. The apparatus may include a processor, and a memory storing instructions executable by the processor. The processor is configured to:

send transmitter receiver point (TRP) configuration information, where the TRP configuration information indicates a master TRP configured by the base station, the master TRP is one of n TRPs configured by the base station, and n is an integer greater than 1;

send BWP switching information through the master TRP, where the BWP switching information is used to instruct switching to a target BWP.

In an example, the TRP configuration information includes identifier information of each TRP; a TRP with minimum identifier information is the master TRP, or a TRP with maximum identifier information is the master TRP.

In an example, the TRP configuration information includes a control resource set (CORESET) serial number and/or CORESET set serial number of each TRP; a TRP with a minimum CORESET serial number and/or CORESET set serial number as the master TRP; or, a TRP with a maximum CORESET serial number and/or CORESET set serial number as the master TRP.

In an example, the TRP configuration information is sent to the terminal via a Radio Resource Control (RRC) signaling, and/or a Medium Access Control (MAC) signaling.

In an example, the master TRP is further configured to, after sending the BWP switching information, send a BWP switching notification to other TRPs than the master TRP in the n TRPs, where the BWP switching notification is used to notify the other TRPs that the terminal already switches to the target BWP; the other TRPs are used to allocate resource to the terminal on the target BWP.

In an example, during a target time period subsequent to sending the TRP configuration information, the other TRPs than the master TRP in the n TRPs are disabled to allocate resource to the terminal.

Another embodiment of the present disclosure further provides an apparatus for switching a bandwidth part (BWP). The apparatus may be applied to the terminal described above to implement the BWP switching method at the terminal side in the present disclosure. The apparatus may include a processor, and a memory storing instructions executable by the processor. The processor is configured to:

receive transmitter receiver point (TRP) configuration information;

determine a master TRP based on the TRP configuration information, where the master TRP is one of n TRPs configured for the terminal, and n is an integer greater than 1;

receive BWP switching information from the master TRP, where the BWP switching information is used to instruct the terminal to switch to a target BWP;

switch to the target BWP based on the BWP switching information.

In an example, the TRP configuration information includes identifier information of each TRP;

the processor is configured to determine a TRP with minimum identifier information as the master TRP, or determine a TRP with maximum identifier information as the master TRP.

In an example, the TRP configuration information includes a control resource set (CORESET) serial number and/or CORESET set serial number of each TRP;

the processor is configured to determine a TRP with a minimum CORESET serial number and/or CORESET set serial number as the master TRP; or, determine a TRP with a maximum CORESET serial number and/or CORESET set serial number as the master TRP.

In an example, the processor is further configured to start a timer when switching to the target BWP; before the timer expires, the terminal communicates with only the master TRP based on allocated resource in physical downlink control channel (PDCCH) information sent by the master TRP.

In an example, the processor is further configured to, after the timer expires, keep in communication with the master TRP, and communicate with other TRPs based on allocated resource in PDCCH information sent by other TRPs of the n TRPs.

In an example, a value of the timer is pre-written into a chip of the terminal, and/or, configured for the terminal by a base station.

The above technical solutions of the embodiments of the present disclosure are described from the perspective of terminal and base station. It can be understood that the base station and the terminal include corresponding hardware structures and/or software modules for executing various functions in order to achieve the above functions. In combination with the units and algorithm steps described in the embodiments of the present disclosure, the embodiments of the present disclosure can be implemented by hardware or by combination of hardware and computer software. Whether a particular function is executed by hardware or by driving the hardware using computer software depends on the specific application and design constraint condition of the technical solution. Those skilled in the art may implement the described functions for each specific application using a different method, but such implementation cannot be considered as exceeding the scope of the technical solution of the embodiments of the present disclosure.

Figure 6:
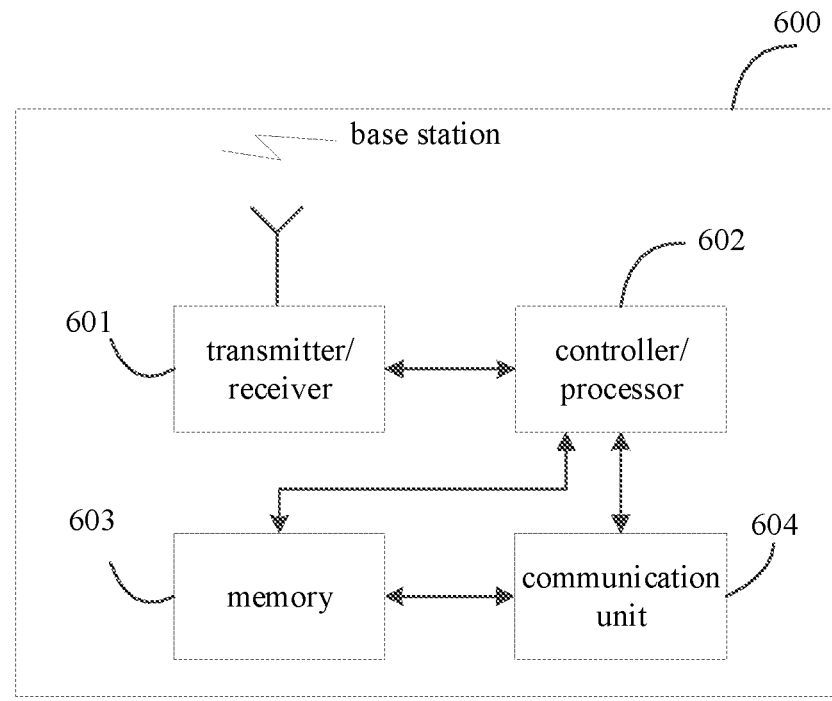
FIG. 6 is a structural schematic diagram illustrating a base station according to an embodiment of the present disclosure.

FIG. 6 is a structural schematic diagram illustrating a base station according to an embodiment of the present disclosure.

The base station 600 includes a transmitter/receiver 601 and a processor 602. The processor 602 may be a controller, which is represented as "controller/processor 602" in FIG. 6. The transmitter/receiver 601 is used to receive and send information between the base station and the terminal described in the above embodiment, and support communication between the base station and other network entities. The processor 602 is used to perform various functions for communication with the terminal. On an uplink, an uplink signal from the terminal is received by antenna and demodulated by the receiver 601 (for example, demodulate a high frequency signal to a base band signal) and then processed by the processor 602 to recover service data and signaling message sent by the terminal. On a downlink, service data and signaling message are processed by the processor 602, and modulated by the transmitter 601 (for example, modulate a base band signal to a high frequency signal) to generate a downlink signal which is then sent to the terminal through antenna. It should be noted that the functions of the above modulation and demodulation may also be completed by the processor 602. For example, the processor 602 is further configured to implement the steps of the base station side in the above method embodiments, and/or other steps of the technical solution described in the embodiments of the present disclosure.

Furthermore, the base station 600 may also include a memory 603 which is used to store program codes and data of the base station 600. In addition, the base station may also include a communication unit 604 which is used to support communication between the base station and other network entities (for example, a network device or the like in a core network). For example, in a 5G NR system, the communication unit 604 may be an NG-U interface used to support communication between the base station and a user plane function (UPF) entity; alternatively, the communication unit 604 may also be an NG-C interface used to support communication with an Access and Mobility Management Function (AMF) entity.

It is understood that FIG. 6 only shows a simplified design of the base station 600. In an actual application, the base station 600 may include any number of transmitters, receivers, processors, controllers, memories and communication units and the like, and all base stations capable of implementing the embodiments of the present disclosure shall fall within the scope of protection of the embodiments of the present disclosure.

Figure 7:
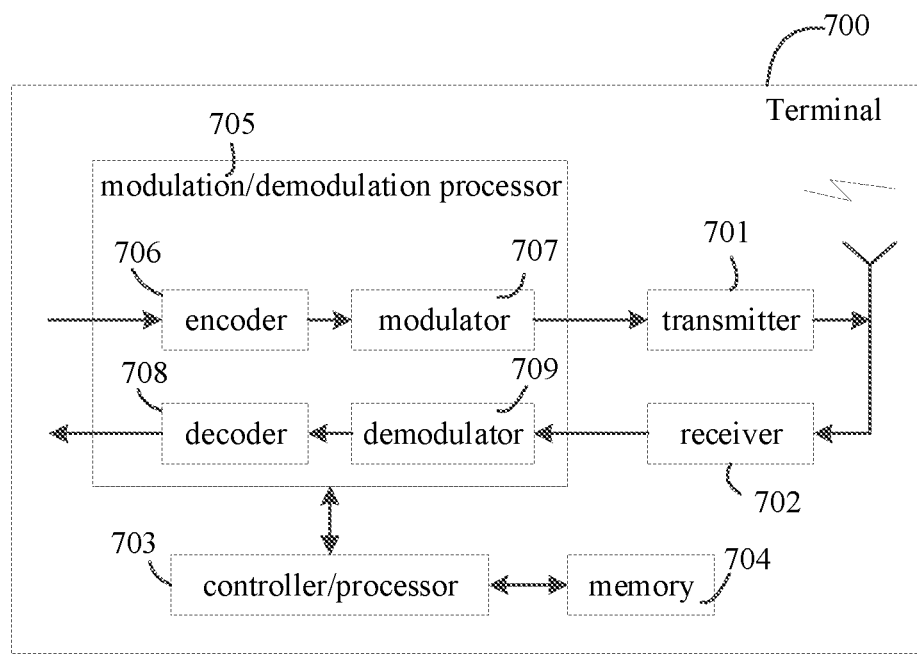
FIG. 7 is a structural schematic diagram illustrating a terminal according to an embodiment of the present disclosure.

FIG. 7 is a structural schematic diagram illustrating a terminal according to an embodiment of the present disclosure.

The terminal 700 includes a transmitter 701, a receiver 702, and a processor 703. The processor 703 may also be a controller which is represented as "controller/processor 703" in FIG. 7. In one example, the terminal 700 may further include a modulation/demodulation processor 705, where the modulation/demodulation processor 705 may include an encoder 706, a modulator 707, a decoder 708, and a demodulator 709.

In an example, the transmitter 701 adjusts (for example, analog conversion, filtering, amplifying and up-conversion and the like) an output sample and generates an uplink signal which is sent to the base station via antenna. On a downlink, the antenna receives a downlink signal from the base station. The receiver 702 adjusts (for example, filtering, amplifying, down-conversion and digitization and the like) a signal from the antenna and provides an input sample. In the modulation/demodulation processor 705, the encoder 706 receives service data and signaling message to be sent on the uplink and processes the service data and the signaling message (for example, formatting, encoding, and interleaving). The modulator 707 further processes (for example, symbol mapping and modulation) the encoded service data and signaling message and provides an output sample. The demodulator 709 processes (for example, demodulate) the input sample and provides symbol estimation. The decoder 708 processes (for example, de-interleaving and decoding) the symbol estimation and provides the decoded data and signaling message sent to the terminal 700. The encoder 706, the modulator 707, the demodulator 709, and the decoder 708 may be implemented by the synthetic modulation/demodulation processor 705. These units perform processings according to a wireless access technology adopted by a wireless access network (for example, 5G NR and access technologies of other evolution systems). It is noted that when the terminal does not include the modulation/demodulation processor 705, the above function of the modulation/demodulation processor 705 may also be implemented by the processor 703.

The processor 703 performs control management over the actions of the terminal 700 to perform the processing process performed by the terminal 700 in the above embodiments of the present disclosure. For example, the processor 703 is further configured to perform various steps of the terminal side in the above method embodiments, and/or other steps of the technical solution described in the embodiments of the present disclosure.

Further, the terminal 700 may include a memory 704 which is used to store program codes and data of the terminal 700.

It is understood that FIG. 7 only shows a simplified design of the terminal 700. In an actual application, the terminal 700 may include any number of transmitters, receivers, processors, modulation/demodulation processors and memories and the like, and all terminals capable of implementing the embodiments of the present disclosure shall fall within the scope of protection of the embodiments of the present disclosure.

An embodiment of the present disclosure further provides a non-transitory computer readable storage medium storing computer programs. The computer programs are executed by a processor of a base station to implement the BWP switching method of the above base station side.

An embodiment of the present disclosure further provides a non-transitory computer readable storage medium storing computer programs. The computer programs are executed by a processor of a terminal to implement the BWP switching method of the above terminal side.

The technical solution provided by the embodiments of the present disclosure has the following beneficial effects.

A base station sends TRP configuration information to a terminal such that the terminal determines a master TRP based on the TRP configuration information. Further, the base station sends BWP switching information to the terminal via the master TRP to instruct the terminal to switch the BWP to a target BWP. Thus, in a scenario where a plurality of TRPs communicate with a terminal, the terminal performs BWP switching based on the BWP instructed by the master TRP. In this way, a BWP switching solution applicable to a multi-TRP scenario is provided to ensure the accuracy of BWP switching and achieve reliable transmission between the terminal and the base station.

It should be understood that "plurality" mentioned in the present disclosure refers to two or more. The "and/or" is used to describe an association relationship of associated objects and represent presence of three relationships, for example, A and/or B represents presence of A alone, presence of both A and B, and presence of B alone. The character "/" generally refers to an "or" relationship of the objects associated back and forth.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and embodiments are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method of switching a bandwidth part (BWP), comprising:
    sending, by a base station, transmitter receiver point (TRP) configuration information, wherein the TRP configuration information indicates a master TRP configured by the base station, the master TRP is one of a plurality of TRPs configured by the base station; and
    sending, by the base station, BWP switching information via the master TRP, wherein the BWP switching information is used to instruct switching to a target BWP,
    wherein during a target time period subsequent to sending the TRP configuration information, other TRPs than the master TRP in the plurality of TRPs are disabled to allocate resource to a terminal, and in the target time period, only the master TRP allocates resource to the terminal and communicates with the terminal;
    wherein the target time period is a time period from start of a timer to expiration of the timer, and the timer is started by the terminal when switching to the target BWP;
    wherein the master TRP is further configured to, after sending the BWP switching information, send a BWP switching notification to the other TRPs than the master TRP in the plurality of TRPs, and the BWP switching notification is used to notify the other TRPs that the terminal switches to the target BWP.

2. The method of claim 1, wherein the TRP configuration information comprises identifier information of each TRP;
    wherein the master TRP is a TRP with minimum identifier information, or the master TRP is a TRP with maximum identifier information.

3. The method of claim 1, wherein the TRP configuration information comprises a control resource set (CORESET) serial number, a CORESET set serial number of each TRP, or the CORESET serial number and the CORESET set serial number of each TRP;
    the master TRP is a TRP with at least one of following parameters: a minimum CORESET serial number, or a minimum CORESET set serial number, or
    the master TRP is a TRP with at least one of following parameters: a maximum CORESET serial number, or a maximum CORESET set serial number.

4. The method of claim 1, wherein,
    the other TRPs are configured to allocate resource to the terminal on the target BWP.

5. A non-transitory computer readable storage medium storing computer programs, wherein the computer programs are executed by a processor to implement the steps of the method according to claim 1.

6. A method of switching a bandwidth part (BWP), comprising:
    receiving, by a terminal, transmitter receiver point (TRP) configuration information;
    determining, by the terminal, a master TRP based on the TRP configuration information, wherein the master TRP is one of the plurality of TRPs configured for the terminal;
    receiving, by the terminal, BWP switching information from the master TRP, wherein the BWP switching information is used to instruct the terminal to switch to a target BWP; and switching, by the terminal, to the target BWP based on the BWP switching information, wherein the method further comprises:

in response to switching to the target BWP, starting, by the terminal, a timer, wherein during a target time period before the timer expires, the terminal communicates with only the master TRP based on allocated resource in physical downlink control channel (PDCCH) information sent by the master TRP, and other TRPs than the master TRP in the plurality of TRPs are disabled to allocate resource to a terminal;

wherein the target time period is a time period from start of the timer to expiration of the timer;

wherein the master TRP is further configured to, after sending the BWP switching information, send a BWP switching notification to the other TRPs than the master TRP in the plurality of TRPs, and the BWP switching notification is used to notify the other TRPs that the terminal switches to the target BWP.

7. The method of claim 6, wherein the TRP configuration information comprises identifier information of each TRP;

the terminal determines the master TRP based on the TRP configuration information, comprising:

determining, by the terminal, a TRP with minimum identifier information as the master TRP; or, determining, by the terminal, a TRP with maximum identifier information as the master TRP.

8. The method of claim 6, wherein the TRP configuration information comprises at least one of a control resource set (CORESET) serial number or a CORESET set serial number of each TRP;

wherein the terminal determines the master TRP based on the TRP configuration information comprising:

determining, by the terminal, at least one of following TRPs as the master TRP: a TRP with a minimum CORESET serial number, or a TRP with a minimum CORESET set serial number; or, determining, by the terminal, at least one of following TRPs as the master TRP: a TRP with a maximum CORESET serial number, or a TRP with a maximum CORESET set serial number.

9. The method of claim 6, further comprising:

after the timer expires, keeping, by the terminal, in communication with the master TRP, and communicating with the other TRPs based on allocated resource in PDCCH information sent by the other TRPs of the plurality of TRPs.

10. The method of claim 6, wherein a value of the timer is pre-written into a chip of the terminal, the value of the timer is configured for the terminal by a base station, or the value of the timer is pre-written into the chip of the terminal and configured for the terminal by the base station.

11. An apparatus for switching a bandwidth part (BWP), being applied to a terminal, comprising:

a processor; and a memory for storing instructions executable by the processor, wherein the processor is configured to implement the steps of the method according to claim 6.

12. A non-transitory computer readable storage medium storing computer programs, wherein the computer programs are executed by a processor to implement the steps of the method according to claim 6.

13. An apparatus for switching bandwidth part (BWP), applied to a base station, comprising:

a processor; and a memory for storing instructions executable by the processor;

wherein the processor is configured to:

send transmitter receiver point (TRP) configuration information, wherein the TRP configuration information indicates a master TRP configured by the base station, the master TRP is one of a plurality of TRPs configured by the base station; and send BWP switching information via the master TRP, wherein the BWP switching information is used to instruct switching to a target BWP, wherein during a target time period subsequent to sending the TRP configuration information, other TRPs than the master TRP in the plurality of TRPs are disabled to allocate resource to a terminal, and in the target time period, only the master TRP allocates resource to the terminal and communicates with the terminal;

wherein the target time period is a time period from start of a timer to expiration of the timer, and the timer is started by the terminal when switching to the target BWP;

wherein the master TRP is further configured to, after sending the BWP switching information, send a BWP switching notification to the other TRPs than the master TRP in the plurality of TRPs, and the BWP switching notification is used to notify the other TRPs that the terminal switches to the target BWP.

* * * * *